US005933834A

United States Patent [19]
Aichelen

[11] Patent Number: 5,933,834
[45] Date of Patent: Aug. 3, 1999

[54] SYSTEM AND METHOD FOR RE-STRIPING A SET OF OBJECTS ONTO AN EXPLODED ARRAY OF STORAGE UNITS IN A COMPUTER SYSTEM

[75] Inventor: Tyky Aichelen, Los Altos, Calif.

[73] Assignee: International Business Machines Incorporated, Armonk, N.Y.

[21] Appl. No.: 08/951,967

[22] Filed: Oct. 16, 1997

[51] Int. Cl.$^6$ ....................................................... G06F 17/30
[52] U.S. Cl. ........................... 707/103; 711/114; 711/170; 395/182.04; 395/200.49
[58] Field of Search ................................... 707/103, 2, 4; 711/4, 100, 101, 112, 114, 206, 209, 2, 170; 395/181, 182.04, 200.49; 364/236.2, 268.3, 268; 348/7

[56] References Cited

U.S. PATENT DOCUMENTS

| | | | |
|---|---|---|---|
| 4,616,319 | 10/1986 | Peters et al. | 364/414 |
| 4,638,381 | 1/1987 | Vaughn | 360/51 |
| 4,647,986 | 3/1987 | Vaughn et al. | 360/35.1 |
| 4,674,064 | 6/1987 | Vaughn et al. | 364/900 |
| 4,680,705 | 7/1987 | Shu | 364/300 |
| 4,953,209 | 8/1990 | Ryder, Sr. et al. | 380/23 |
| 4,989,191 | 1/1991 | Kuo | 369/33 |
| 5,191,410 | 3/1993 | McCalley et al. | 358/86 |
| 5,195,092 | 3/1993 | Wilson et al. | 370/94.2 |
| 5,208,665 | 5/1993 | McCalley et al. | 358/86 |
| 5,267,351 | 11/1993 | Reber et al. | 395/600 |
| 5,307,456 | 4/1994 | MacKay | 395/154 |
| 5,438,674 | 8/1995 | Keele et al. | 395/404 |
| 5,502,811 | 3/1996 | Ripberger | 395/182.04 |
| 5,502,836 | 3/1996 | Hale et al. | 711/170 |
| 5,506,977 | 4/1996 | Jones | 711/155 |
| 5,537,567 | 7/1996 | Galbraith et al. | 711/144 |
| 5,586,264 | 12/1996 | Belknap et al. | 395/200.49 |
| 5,603,058 | 2/1997 | Belknap et al. | 395/855 |
| 5,657,468 | 8/1997 | Stallmo et al. | 711/114 |
| 5,712,976 | 1/1998 | Falcon, Jr. et al. | 395/200.49 |

FOREIGN PATENT DOCUMENTS 6-67944  1/1994  Japan ............................... G06F 12/00

OTHER PUBLICATIONS

IBM TDB, D. B. Johnson, et al., "Compressed/Encrypted Multimedia Objects Realtime Search and Retrieval", vol. 37, No. 03, Mar. 1994.
IBM TDB, J.W. Feeney, et al., "Bi–Directional Adapter for Multi–Media Network Applications", vol. 38, No. 10, Oct. 1996.
IBM TDB, R.F. Heisch, "Implementing Trace–Directed Program Restructuring for Global Data at the Postprocessing Level", vol. 37, No. 02B, Feb. 1994.
IBM TDB, K. Dutke et al., "Multimedia Audio on Demand", vol. 37, No. 06B, Jun. 1994.
The RaidBook, A Source Book for Disk Array Technology, Fourth Edition, The Raid Advisory Board, Aug. 8, 1994.

*Primary Examiner*—Paul R. Lintz
*Assistant Examiner*—Ella Colbert
*Attorney, Agent, or Firm*—Noreen A. Krall

[57] ABSTRACT

In a computer system having a processor, memory, and a set of storage units storing a set of objects, each object comprising a set of segments arranged in a set of original object stripes on separate storage units, a directory is maintained identifying an object name and a location of each stripe of the object in the set of storage units. A method is provided for re-striping the set of objects onto an expanded set of storage units comprising the set of storage units and at least one other additional storage unit. A list is maintained of each object to be copied onto the expanded set of storage units. Each segment is copied to a new set of stripes on a separate storage unit of the expanded set to create a new object while continuing to store an original copy of each segment of the list object in the original set of object stripes. The directory is updated to include a new object name and a new location of each new stripe of the new object. After all the list object segments are copied to the new stripes, the original copy of each list object segment is deleted and the new object is renamed in the directory to the list object name.

14 Claims, 5 Drawing Sheets

| Video directory | | | |
|---|---|---|---|
| Name<br>version<br>segment size<br>No. of stripes | V1<br>1<br>256k<br>3 | V2<br>1<br>256k<br>4 | ... |
| Disk Node<br>file system ID<br>file system handle | 0<br>d: /V1.1<br>– | 0<br>d: /V2.1<br>– | |
| Disk Node<br>file system ID<br>file system handle | 0<br>d: /V1.2<br>– | 0<br>d: /V2.2<br>– | |
| Disk Node<br>file system ID<br>file system handle | 0<br>d: /V1.3<br>– | 0<br>d: /V2.3<br>– | |
| Disk Node<br>file system ID<br>file system handle | | 0<br>d: /V2.4<br>– | |
| ⋮ | | | |

*FIG. 3*

|  | VOL D | VOL E | VOL F |  |
|---|---|---|---|---|
|  | $V1:S1$ | $V1:S2$ | $V1:S3$ |  |
|  | $V1:S4$ | $V1:S5$ | $V1:S6$ |  |
|  | ⋮ | ⋮ | ⋮ |  |
|  | $V1:S_n$ | $V1:S_{n+1}$ | $V1:S_{n+2}$ |  |
|  | ⋮ | ⋮ | ⋮ |  |

⇓

| VOL D | VOL E | VOL F | VOL G |
|---|---|---|---|
| $V1:S1$ | $V1:S2$ | $V1:S3$ |  |
| $V1:S4$ | $V1:S5$ | $V1:S6$ |  |
| $V1:S7$ | $V1:S8$ | $V1:S9$ |  |
| ⋮ | ⋮ | ⋮ |  |
| $V1:S_n$ | $V1:S_{n+1}$ | $V1:S_{n+2}$ |  |
| $V2:S1$ | $V2:S2$ | $V2:S3$ | $V2:S4$ |
| $V2:S5$ | $V2:S6$ | $V2:S7$ | $V2:S8$ |
| ⋮ | ⋮ | ⋮ | ⋮ |
| $V2:S_m$ | $V2:S_{m+1}$ | $V2:S_{m+2}$ | $V2:S_{m+3}$ |
| ⋮ | ⋮ | ⋮ | ⋮ |

*FIG. 4*

50 — List of Objects to be copied

| object | status |
|---|---|
| V1 | to be copied later |
| V2 | copied |
| → V3 | next object to be copied |
| V4 |  |
| ⋮ |  |

52 — List of Object to be copied Later

SYSTEM AND METHOD FOR RE-STRIPING A SET OF OBJECTS ONTO AN EXPLODED ARRAY OF STORAGE UNITS IN A COMPUTER SYSTEM

FIELD OF THE INVENTION

This invention relates to a system for redistributing data onto an expanded array of disk drives, and more particularly to a video server system where video data is remapped onto an expanded array of disk drives.

BACKGROUND OF THE INVENTION

A disk array is a collection of hard disk drives (HDDs) combined with array management software which controls the operation of the HDDS and presents them as one or more virtual HDDs to the host operating environment. The array management software masks the internal complexity of the disk array from the host operating environment by mapping virtual disk block addresses to member disk block addresses, so that the I/O operations are properly targeted to the physical storage. Arrays of HDDs are used to better match the I/O needs of a host computer with the performance limitations of disk drives. Using multiple storage devices to communicate data to the host system improves I/O performance for the host computer.

A Redundant Array of Independent Disks (RAID) system refers to a storage array where redundancy is provided. That is, part of the storage capacity is used to store redundant information about user's data stored on the remainder of the storage capacity. The redundant information enables regeneration of user data in the event that one of the arrays member disks or access path fails. Six levels of RAID systems are currently defined in the RAID book, "A Source for Disk Array Technology", Fourth Edition, The RAID Advisory Board.

RAID level 1 refers to data mirroring. In RAID level 2, a block of data is broken up and striped across a set of disk drives on a bit level and ECC codes for reconstructing each data block are stored on a separate set of disk drives. In order to access a block of data, all of the drives are accessed together. In RAID level 3, a block of data is also broken up and striped across a set of drives. Parity data for reconstructing each block is stored on a separate disk drive. In RAID level 4, a set of data blocks is striped across a set of drives, with parity data for the set of blocks (used for reconstructing one of the blocks of the set) stored on a separate disk drive. In a RAID level 4 system, each block can be accessed from a single drive. A RAID level 5 system is similar to a RAID level 4 system except that no one disk drive stores all of the parity. In a RAID level 6 system two blocks of parity are used for each set of data blocks such that two blocks of data can be reconstructed per set. RAID level 0, refers to a disk array where data is striped, but, redundancy is not used.

The host system executes application programs and device driver software which communicates with the storage devices. The application programs issue requests to access data stored on the storage devices which are routed through an I/O bus adaptor. The host system contains memory where data is read from and written to. An I/O bus adaptor provides an interface between the I/O bus and the host computer memory. The adaptor accepts commands from an I/O driver and relays the commands to the addressed storage devices. The I/O bus itself is the medium in which host commands, disk responses, and data are moved between bus adaptors and the storage devices. The storage devices provide block addressable random read/write access to data storage. An example of an I/O bus is the small computer storage interconnect (SCSI).

A disk controller connects a host computer's I/O bus to the storage device I/O bus using an I/O bus adaptor, such as a channel. The controller connects the host to additional storage devices and provides for greater I/O capacity. Each of the controller channels is an independent path for data which extend the subsystem's data transfer capacity.

An array stripe depth refers to the number of contiguously mapped virtual disk blocks in the array. The size of the stripe depth depends on the type of application requests that are made.

For application requests which specify large amount of data a significant portion of the I/O request execution time consists of the data transfer. If such requests are made to a virtual disk where the data is striped across each of the disks, most application I/O requests to the virtual disk will result in split I/O requests. For example, if there are four member disks in an array and requested data is mapped evenly across the three member data disks, each disk can independently be transferring its portion of the requested data. In that way, the I/O load is split among the disk drives.

Alternatively there can be request intensive application programs where a large number of small I/O requests are made. For such applications it is advantageous not to split the I/O request but to store all of the requested data on a single drive. For data transfer intensive application, such as image processing, the stripe depth should ideally be set so that the average I/O request is split across all members of the array on which the data is stored. For I/O request intensive applications, such as transaction processing, the stripe depth should be set so that the average I/O request has a small probability of being split across multiple array members.

An example of an I/O intensive application benefiting from striping data across a set of storage devices is a video server system. Computers are used to compress and store video material in digital format. This enables video on demand over telephone lines and pay-per-view movies in hotels. Compression technology enables the compression ratios which allow for the storage of videos on disk technology. Disk technology allow for random access of digital data and in an array subsystem provide high bandwidth. One such subsystem is described in commonly owned patent application Ser. No. 08/302,625, Belnapp et al., filed Sep. 8, 1994 hereby incorporated by reference.

The video server described in the application Ser. No. 08/302,065 provides a technique for serving many simultaneous streams from a single copy of data using data striping techniques like those used in RAID systems. Data striping involves the concept of a logical file whose data is partitioned to reside in multiple file components called stripes. Each stripe is stored on a different disk volume, thereby allowing the logical file to span multiple physical disks. The disk may be either local or remote. When the data is written to a logical file it is separated into logical lengths called segments that are placed sequentially into the stripes.

For example, a logical file for a video can be segmented into M segments or blocks, each of a specific size, e.g. 256 kilobytes. The last segment may only be partially filled with data. A segment of data is placed in the first stripe followed by the next segment that is placed in the second stripe, etc. When a segment has been written to each of the stripes the next segment is again written to the first stripe. Thus, if a file of M segments is being stripped into N stripes then stripe 1 will contain the segments 1, N+1, 2×N+1, etc., stripe 2 will contain the segments 2, N+2, 2×N+2, etc., until all M segments are stored in one of the N striped files.

In RAID systems the purpose of striping is to assure data integrity in case a disk is lost. A RAID system dedicates at least one of N disks to the storage of parity data that is used when data recovery is required. In the video server system the disk storage nodes are organized as RAID like structure, but parity data is not always required since a copy of the date video data can be available from a tape storage.

In a video server, striping is used for concurrency and bandwidth reasons. Each video presentation is separated into data blocks or segments that are spread across available disk drives to enable each video presentation to be accessed simultaneously from multiple disks without requiring multiple copies.

In a stream optimized video server using data striping for increased system capacity, both storage capacity and the number of streams is effected by adding additional disk drives. When disk drives are added, the data on existing drives needs to be restriped across the existing and newly added drives to enable the use of the additional capacity provided by the addition of the disk drives.

There is also a need to be able to simultaneously support objects striped over a variable number of disk drives. So that existing objects can be accessed while new objects are striped over a larger number of drives including the drives that the existing objects are using.

It is desirable that such a system continue to operate while data re-striping is taking place. This is true of systems other than video streamers using a storage array where additional storage capacity is being added.

SUMMARY OF THE INVENTION

It is an object of the invention to provide a system and method for re-striping objects stored in an array of storage devices without disrupting normal operations of the system and to run without requiring the host system. It is desirable that such a system re-stripe a large amount of objects in a production environment and re-stripe a small amount of objects in a test environment.

One or more of the foregoing problems are solved or objectives achieved using the present invention which provides a technique for re-striping data across a set of disk drives while the data is in use.

In a computer system having a processor, memory, and a set of storage units storing a set of objects, each object comprising a set of segments arranged in a set of original object stripes on separate storage units, a directory is maintained identifying an object name and a location of each stripe of the object in the set of storage units. A method is provided for re-striping the set of objects onto an expanded set of storage units comprising the set of storage units and at least one other additional storage unit. A list is maintained of each object to be copied onto the expanded set of storage units. Each segment is copied to a new set of stripes on a separate storage unit of the expanded set to create a new object while continuing to store an original copy of each segment of the list object in the original set of object stripes. The directory is updated to include a new object name and a new location of each new stripe of the new object. After all the list object segments are copied to the new stripes, the original copy of each list object segment is deleted and the new object is renamed in the directory to the list object name.

DETAILED DESCRIPTION OF THE INVENTION

Figure 1:
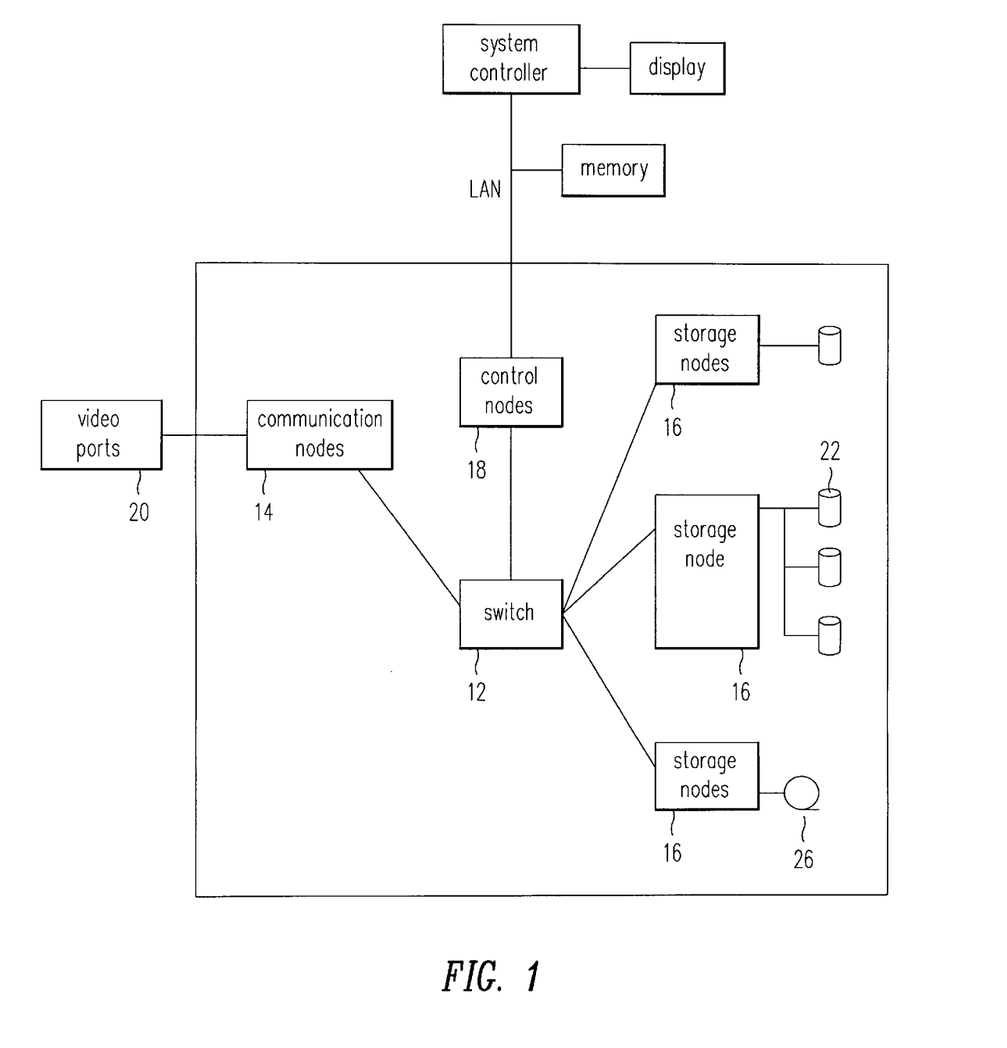
FIG. 1 is a block diagram of a system incorporating the current invention.

FIG. 1 shows a video server system which provides for the presentation of multiple videos to multiple users. The video server 10 contains a low latency switch 12, which delivers data and control information between communication nodes 14, storage nodes 16 and control nodes 18.

The communication node 14 enables delivery of the data or the receiving of the data over an externally defined interface which are familiar to the broadcast industry such as NTFC, PAL, D1 and D2. The digital to video interface is embodied in a video card contained in a plurality of video ports 20 connected at the output of each communication node 14. The storage node 16 manages the storage medium such as disk arrays 22. The control node component 18 receives and executes control commands from an externally defined subsystem interface. An exemplary video server will contains 64 nodes with 31 communication nodes, 31 storage nodes, 2 control nodes interconnected with a low latency switch.

In a video presentation, one or more images may be logically related such as sequential frames of a film. The images may originally be generated by camera or digital computer or by a combination of a camera and video computer. A video presentation may also include an audio portion. The audio portion may be synchronized with the display of successive images. A data representation of a video presentation can be any suitable digital data format for representing one or more images and possibly audio. The digital data may be encoded or compressed.

A tape storage node 24 includes a tape library controller interface which enables access to multiple tape records contained in a tape library 26. A further interface enables access to other tape libraries via a SCSI bus interconnection.

The tape storage node 24 includes an internal system memory which enables buffering of video data. The system memory may be a portion of a PC which includes software for tape library and file management actions. A switch interface and buffer module enables interconnection between the tape storage and the switch. The buffer module partitions the data transfer into packets and adds a header portion to each package that is used by the switch to route the package.

Video data from the tape library is routed through the low latency switch to a disk storage node 22 to be made ready for substantially immediate access when needed. Each disk storage node includes a switch interface and a buffer module (not shown) which enables data to be transferred from or to a buffer video cache and storage interface module. The interface spreads received video data onto a plurality of disks. The disk storage node has an internal PC which includes software modules which provide storage node control, video file and disk control and RAID mapping for data stored on the disks.

Each disk storage node provides a more immediate level of video data availability than a tape storage node. Each disk storage node includes a cache for the video data so as to provide to even faster availability of video data.

The video streamer 10 has three external interfaces, a control interface which is an open system executing TCP/IP, a stream delivery interface using an industry standard such as NTSE, and an automation control interface which also uses industry standard control interfaces, such as Genloc or BlackBurst.

Application commands are issued to the video server over the control interface. When data load commands are issued, the control node breaks the incoming data file into segments and spreads it across one or more storage nodes. Material density and the number of simultaneous users of the data affect the placement of the data on the storage node. Increasing density and or simultaneous users implies the use of more storage nodes for capacity and bandwidth.

Data is moved between the disk storage nodes and the communication nodes via the low latency switch and a scheduling algorithm. The data stream that is emitted from the communication node interfaces multiplex to and from disk storage so that a single communication node stream uses a fraction of the capacity and bandwidth of each disk storage node.

The storage nodes are managed as a heterogenous group, each with a potentially different bandwidth capability and physical definition. The "create" command triggers the video server to allocate storage in one or more storage nodes for a multimedia file and its associated metadato. The create command specifies both the stream density and the maximum number of simultaneous users required.

In video applications there is a need to deliver multiple streams from the same data. This requirement translates to a need to read data at a high data rate. A logical video file has data partitioned to reside in multiple file components called stripes. Each stripe is allowed to exist on a different disk volume, thereby allowing the logical file to span multiple physical disks. The disk can be local or remote.

Figure 2:
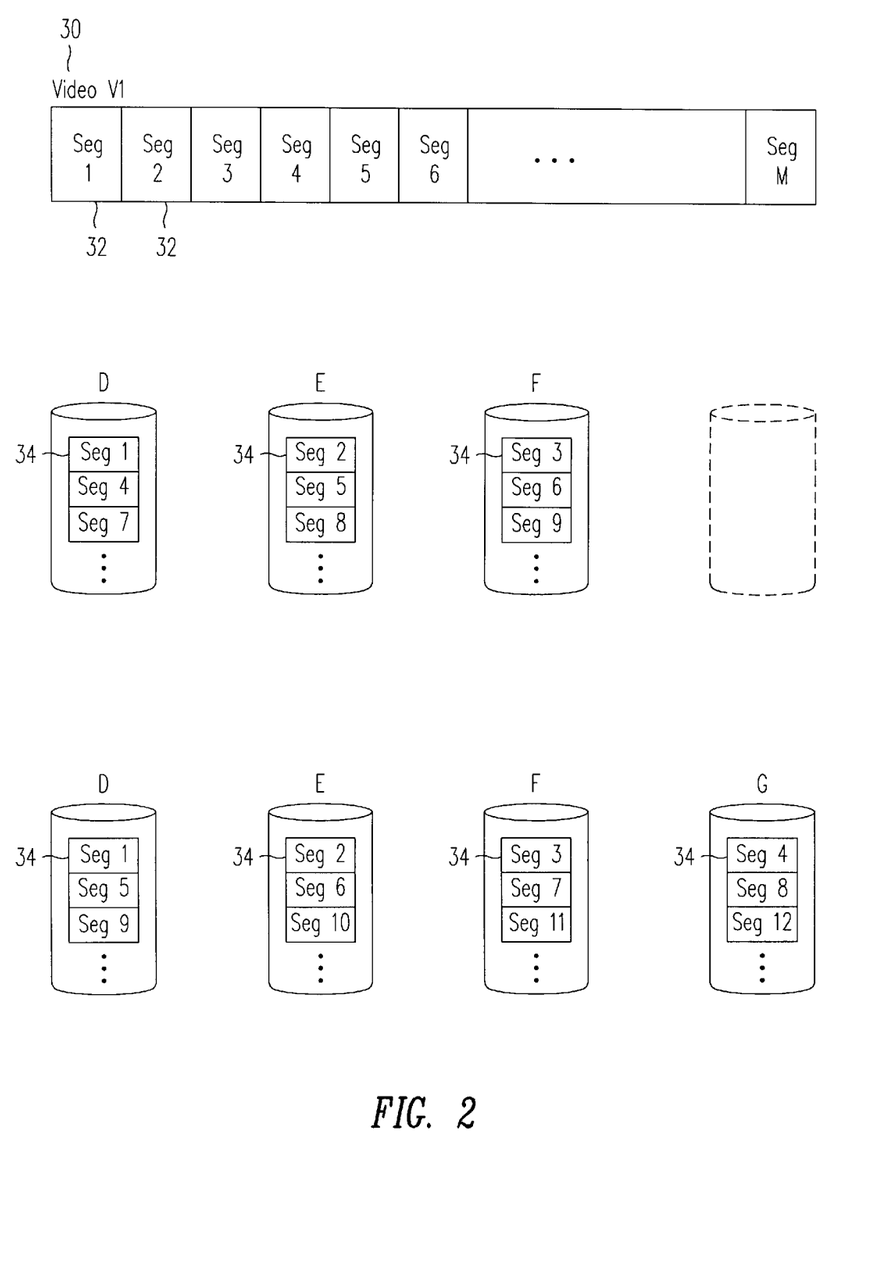
FIG. 2 illustrates a segmented logical file for a video and the striping of the segmented logical file on a plurality of disk drives according to the present invention.

Referring to FIG. 2, when the data is written to the logical file 30 it is separated into logical lengths referred to as segments 32 that are placed sequentially into the stripes 34. A logical file for a video can be segmented into M segments or blocks, each of a specific size such as 256 kilobytes. The last segment may be only partially filled with data. A segment of data is placed on the first stripe followed by a next segment that is placed in the second stripe and so on. When a segment has been written to each of the stripes, the next segment is written to the first stripe. A file being striped into N stripes has stripe 1 containing segments 1, N+1, 2×N+1 and so on. Stripe 2 contains segments 2, N+2, 2×N+2 and so on. This is similar to the striping used in RAID systems except that parity data is not required because a copy of the video data is available from tape storage.

The separation of each video presentation into data blocks or segments that are spread across the available disk drives enable each video presentation to be accessed simultaneously from multiple drives without requiring multiple copies. The video presentation is striped according to play segments. A video file segmented into M segments and split into four stripes, stripe 1 contains segments 1, 5, 9, and so on of video file 1. Stripe 2 is a file containing segments 2, 6, 10, and so on of video file 1. Stripe 3 is a file containing segments 3, 7, 11, and so on of the video file. Stripe 4 is a file containing the segments 4, 8, 12, and so on of the video file until all M segments of the video file are contained in one of the four striped files.

There are a number of parameters that are used to customize the striping of each individual video. The segment size is selected so as to obtain a reasonably effective data rate from the disk without affecting latency and small enough to be able to be buffered in memory. A preferred segment size is 256 kilobytes and is constant for video presentation of data rates and ranges from 128 kilobytes per second to 512 kilobytes per second. If the video data rate is higher then it may be preferable to use a larger segment size. The segment size depends on the basic unit of I/O operation or the range of video presentation stored on the same media. Preferably a segment size contains half a second to two seconds of video data.

The number of stripes and the number of disks over which video data is distributed must be large enough to sustain the total data rate required and is computed individually for each video presentation based on the anticipated usage rate. More specifically each disk has a logical volume associated with it. Each video presentation is divided into component files, as many components as the number of stripes needed. Each component file is stored on a different logical volume.

The number of disks over which data for a video presentation is striped are managed as a set and can be thought of a very large physical disk. Striping allows a video file to exceed the size limit of the largest file that a system's physical file system will allow. The video data in general will not always require the same amount of storage in all disks in the set to balance the usage of the disk. When a video is striped the striping is begun from the disk that has the most free space.

Figure 3:
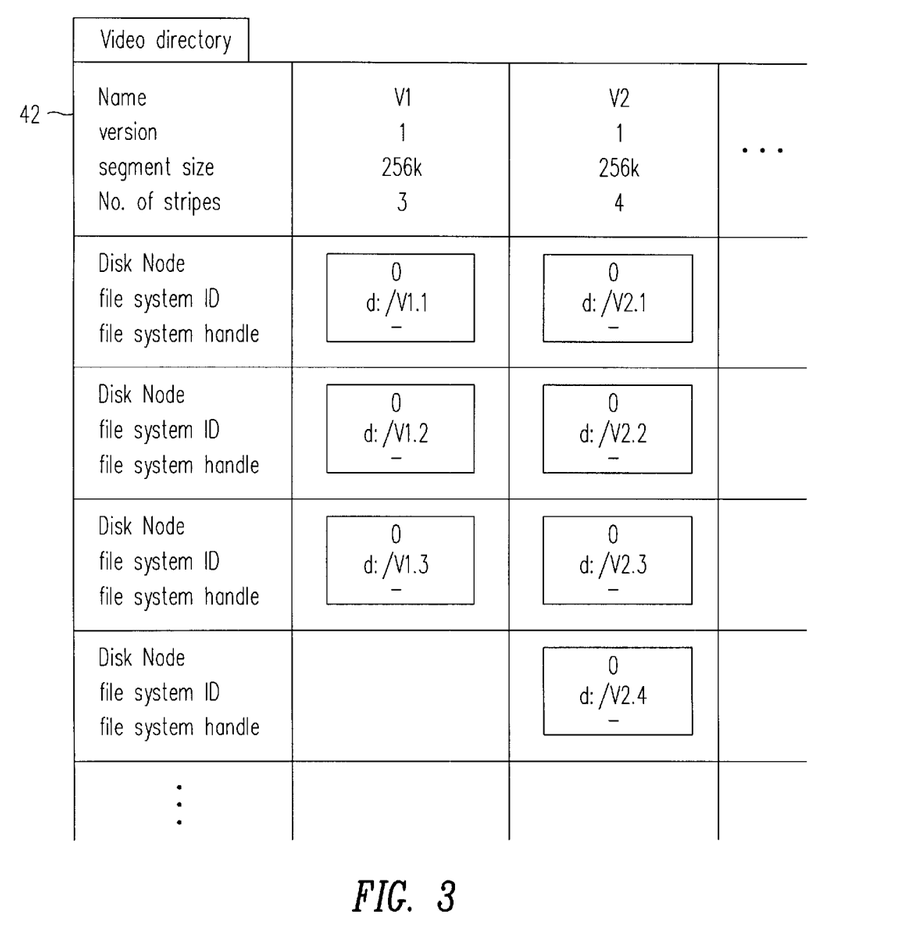
FIG. 3 illustrates a directory for the segments of the video file.

Referring the FIG. 3, the striping algorithm uses a mapping structure directory 40 to map the segments of a video or data object to files stored on different DASD. The video directory contains the name, version, and segment size of each video object. The video directory also contains the number of stripes or files that the video is mapped onto, where each file is normally stored on a different HDD device, and the identity of the disk node storing each of the stripes in sequential order. As shown in FIGS. 2 and 3, the object V1 is initially striped over three DASD volumes D, E, and F. The directory in FIG. 3 provides the information for locating each of the segments. As shown in FIG. 2, when a new disk drive G is added, the video object is restriped over the expanded set of disk drives.

Figure 4:
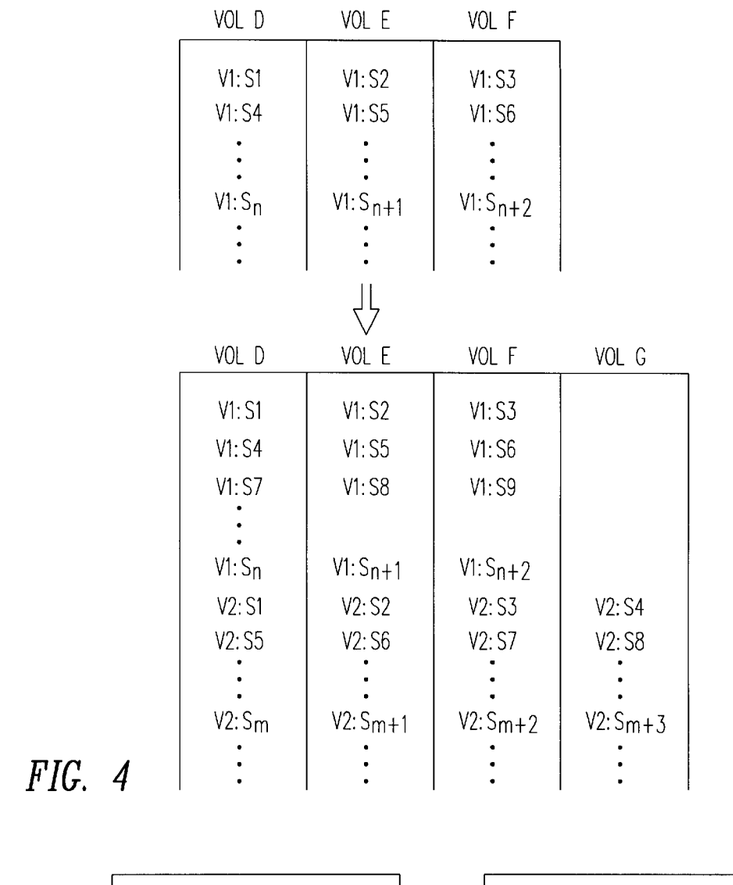
FIG. 4 illustrates a mapping of the segments of a video file according to the present invention.

Referring to FIG. 4, when a new DASD volume, for example, G is added, the mapping structures for the existing objects are not changed and can be accessed while new data object V2 is striped over all of the volumes of the expanded array including the additional volume. Because each object has its own mapping structure the server can access objects striped over varying numbers of DASD volumes simultaneously. Additionally, the existing objects can be restriped (as shown in FIG. 2) by being copied to new locations on the expanded set of DASDs while the original version remains accessible, as long as the mapping structure for the original object remains in place. After the object is copied and restriped across all of the volumes of the expanded array, the original copy of the object can be deleted which allows the space to be reclaimed without disrupting operations.

Figure 5:
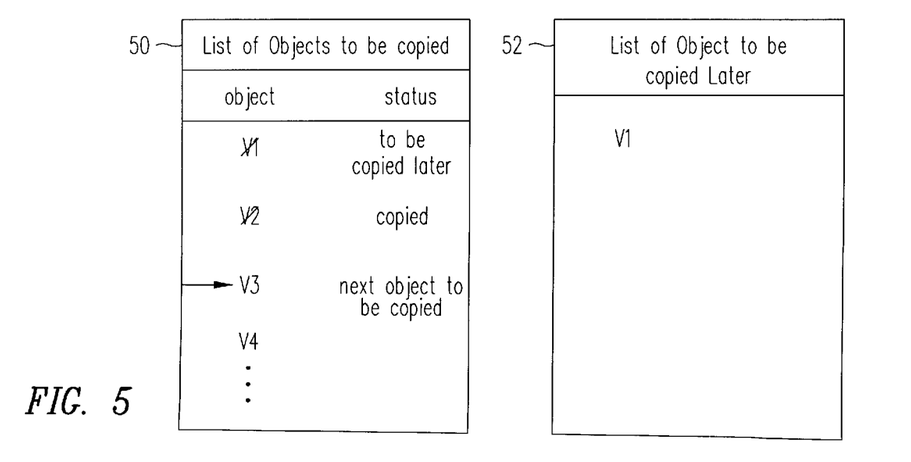
FIG. 5 illustrates a list of objects being copied.
Figure 6:
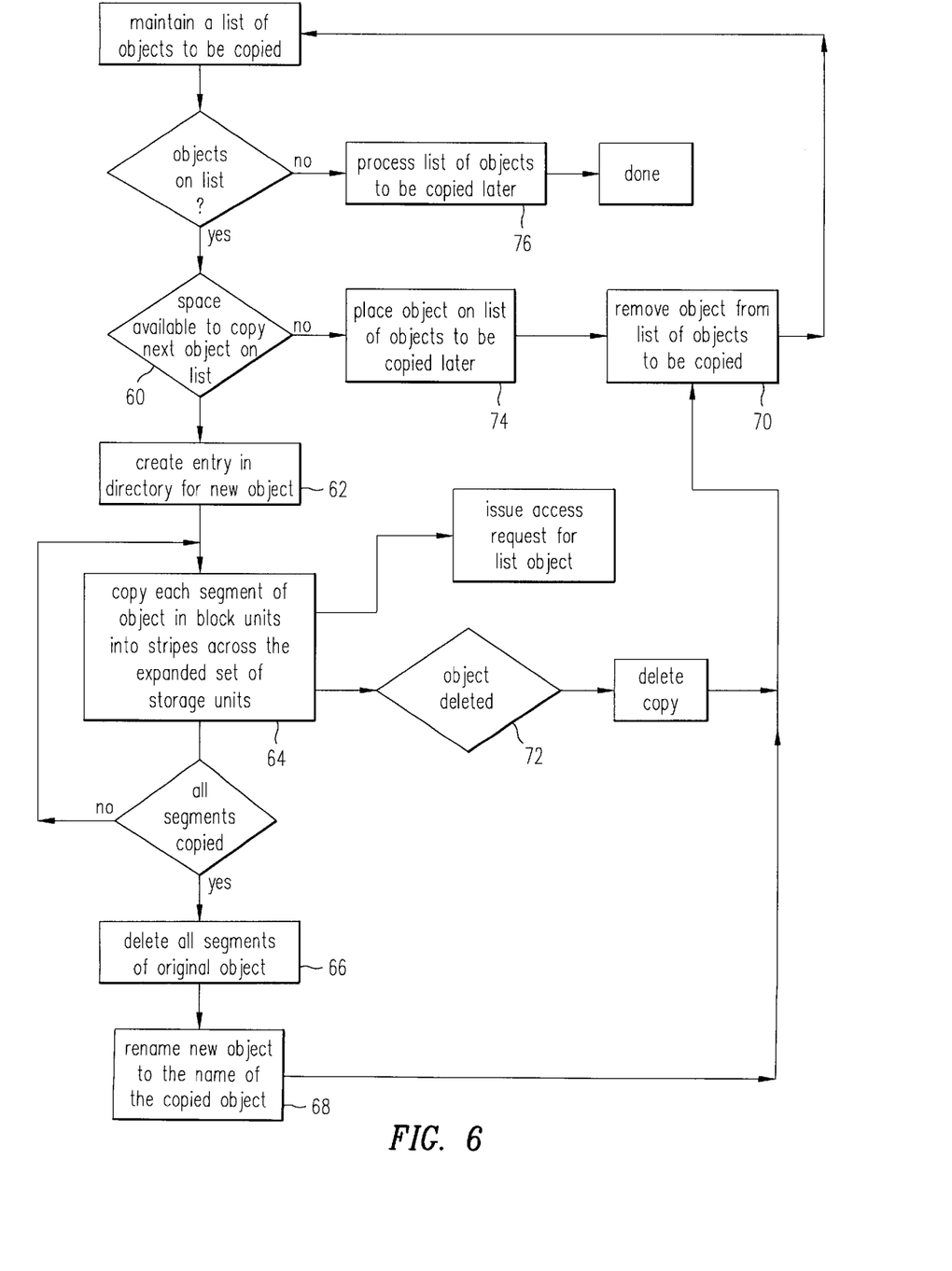
FIG. 6 is a flow chart of the process for re-striping objects according to the present invention.

The process for re-striping all of the objects onto the expanded set of DASDs will be described with reference to FIGS. 5 and 6. In order to restripe the objects, a list 50 is obtained of all objects on the video server. This list is maintained in the storage node memory. An empty list is created in the memory to store a list of all of the objects that become designated as not being restripable at the present time (all "non-restripable now" objects) 52. Another empty list is created in memory to store the list of objects that have been successfully re-striped.

The process for re-striping all of the objects onto the expanded array of DASDs involves going down the list of the objects currently stored in the original array of DASDs one object at a time. The first object on the list or next object in the list is selected. A determination is made if there is sufficient free space to make a copy of the selected object from the list 60. That is, whether there is sufficient space on each DASD for the copy of the stripe. If there is not sufficient space for each of the stripes of the selected object, the next object on the list, which may not be as large an object as the first selected object, is selected.

If none of the objects on the list can be selected because there is insufficient space to copy any of the objects, then the system waits for some time and then tries again to select the first object. The wait is to allow some of the objects currently stored in the array to be deleted to create more free space, since objects are regularly being deleted. The list of objects to be re-striped is also refreshed to reflect the current list of objects stored on the DASDs to be re-striped.

When there is enough free space in the array, a copy of the selected object on the list is made. A new temporary object with a new name is added to the object mapping directory (as shown in FIG. 3) and all the information of where the stripes are to be stored for the object segments are also stored in the object mapping directory for the newly created object (which is to be a copy of the selected object, re-striped over all of the DASDs of the expanded array) 62.

In order to copy the segments of the selected object, the selected object is opened for reading. The object is read into memory in small blocks, for example, 256 kilobytes blocks, starting from the beginning segment of the object 64. The read blocks are then written to the locations designated for the newly created temporary object.

When all the data for the selected object has been copied to the temporary object, the temporary object is renamed to the selected object name in the mapping structure directory 68. In order to rename the temporary object to the original selected object name, the original is deleted from the mapping structure 66. In a first embodiment, the renaming of the temporary object to the selected object name may require the original object to be deleted from the DASDs of the array. Otherwise, the original selected object can be deleted during a separate deletion process, depending on the system requirements.

After the object is copied, the selected object is deleted from the list of objects to be copied 70.

If any of the objects on the list of objects to be copied are deleted prior to its being fully copied and the temporary object being renamed, then the temporary object is also deleted 72.

This process continues until all objects have been restriped or deleted from the list of objects to be copied. The mapping structure allows objects to be accessed when striped over any number of the disk drives of the array less than or equal to the total number of disk drives in the system. Thus, when additional drives are added the existing objects can be accessed even though they are striped on fewer drives then the newly created temporary objects which will be striped over all the drives in the array including the newly added ones.

When none of the objects from the list of objects to be copied are selected because there is not sufficient free space, then all objects are moved to the "not restripable now"

objects list 74. Also, if the object cannot be renamed because it is in use, the object name is moved to the list of nonrestripable now objects. A list of objects that have been restriped is also created as a reference.

The objects in the list of objects that cannot be restriped are again selected after the remaining objects on the list of objects to be re-striped have been selected and re-striped or moved to the list of objects that can not be re-striped at the current time 76. An attempt is again made to re-stripe the objects on the list of non-restripable now objects. Those that can are again placed in turn on another list. This process is repeated until all objects have been restriped or deleted.

The mapping structure provides the flexibility for simultaneously supporting objects striped over a variable number of disk drives which allows reading of existing objects while striping new objects over a larger number of drives including the drives that the existing objects are using.

The deletion of an original selected object when it is renamed after having been restriped allows the disk space to be reclaimed as soon as possible for re-striping of other objects, thus requiring a minimum amount of free space on the existing drives.

The ability to restripe objects based on a file containing a list of names allows re-striping to occur without disrupting normal operation and can be triggered to run unattended. This process is suitable for large amount of objects in a production environment. The base function ability to restripe objects by a specific name or name mask allows re-striping to occur still without disrupting normal operations and returning interactive messages. This process is also suitable for small amounts of objects focused on in a test environment.

Although described primarily in the context of a video server, it is well understood by those skilled in the art, that the re-striping of data in an array can be used by a number of applications.

The forgoing description is only illustrative of the invention. Alternatives and modifications can be devised by those skilled in the art without departing from the invention, The present invention is intended to include all such alternatives, modifications and variances which fall within the scope of the following claims.

I claim:

1. In a computer system having a processor, memory and a set of storage units storing a set of objects, each object comprising a set of segments arranged in an original set of object stripes on separate storage units, wherein a directory is maintained identifying an object name and a location of each object stripe in the set of storage units, a method for re-striping the set of objects onto an expanded set of storage units comprising the set of storage units and at least one additional storage unit, comprising the steps of:

a) maintaining a list of each object to be copied onto the expanded set of storage units;
   b) copying each segment of a list object in block units to a new set of new stripes on separate storage units of the expanded set to create a new object while continuing to store an original copy of each segment of the list object in the original set of object stripes;
   c) updating the directory to include a new object name, and a new location of each new stripe of the new object;
   d) after all of the list object segments are copied to the new stripes, deleting the original copy of each list object segment from the original set of object stripes and renaming, in the directory, the new object to the list object name; and e) deleting a list object from the list of each object to be copied once all of the list object segments have been copied to the new stripes and the object is renamed to the list object name.

2. The method of claim 1 further comprising the steps of:

identifying whether there are sufficient available storage locations in each storage unit of the expanded set in which to copy the segments of the list object; and when there are not sufficient available storage locations, placing the list object on a delay list of objects to be copied at a later time, and designating a next object on the list of each object to be copied as the list object.

3. The method of claim 1 wherein each object is a video, each stripe is a clip of the video of a set duration and each storage unit is an array of disk drives.

4. The method of claim 1 wherein the segments are striped sequentially across the storage units.

5. The method of claim 1 wherein an access request for a requested object is executed during the re-striping of the segments of the requested object.

6. The method of claim 1 wherein when a list object is deleted while it is being copied, the new object is also deleted.

7. A computer storage and retrieval system comprising:

a set of storage units storing sets of data objects, each data object comprising segments stored in stripes on separate storage units wherein an additional storage unit is added to the set of storage units to produce an expanded set of storage units;

a directory stored in a memory cataloging each object name and a location for each object stripe;

a listing maintained in memory of each object to be copied onto the expanded set of storage units;

means for identifying whether there is sufficient available storage locations in the expanded set in which to copy a list object and designating a next object on the list of each object to be copied as the list object, when there is not sufficient available storage location to copy the list object;

means for copying each segment of the list object to a new set of new stripes on separate storage units of the expanded set to create a new object while continuing to store an original copy of each segment of the list object in the set of object stripes;

means for updating the directory to include a new object name, and a new location of each new stripe of the new object; means for deleting the original copy of each list object segment after all of the list object segments are copied to the new stripes;

means for renaming, in the directory, the new object to the list object names;

means for deleting the new object when the list object is deleted while it is being copied; and means for satisfying an access request for the list object during the re-striping of the segments of the list object.

8. The system of claim 7 further comprising:

means for placing the list object on a delay list of objects to be copied at a later time when there is not sufficient available storage location to copy the list object; and means for deleting a list object from the list of each object to be copied once all of the list object segments have been copied to the new stripes.

9. The method of claim 7 wherein the computer storage and retrieval system is a video server, the objects are a video and each stripe is a clip of a predetermined duration.

10. The method of claim 7 wherein the segments are stored sequentially across the set of storage devices such that there are x stripes, segments numbered 1, x+1, 2*x+1, and so forth are the first stripe, segments numbered 2, x+2, 2*x+2 are the second stripe, and so forth.

11. An article of manufacture for use in a computer system for re-striping a set of objects stored on an original set of stripes on separate storage units onto a new set of stripes on an expanded set of storage units, the expanded set including the set of storage units and at least one additional storage unit, said article of manufacture comprising a computer-readable storage medium having computer program code embodied in said medium which causes the computer system to:

maintain a list of each object to be copied onto the expanded set of storage units;

copy each segment of a list object to a new set of new stripes on separate storage units of the expanded set to create a new object while continuing to store an original copy of each segment of the list object in the set of object stripes;

update an object directory to include a new object name, and a new location of each new stripe of the new object;

after all of the list object segments are copied to the new stripes, delete the original copy of each list object segment from the original set of stripes and renaming, in the object directory, the new object to the list object name;

identify whether there is sufficient available storage locations in the expanded set in which to copy the list object;

when there is not sufficient available storage location, place the list object on a delay list of objects to be copied at a later time, and designate a next object on the list of each object to be copied as the list object;

delete the list object from the list of each object to be copied once all of the list object segments have been copied to the new stripes; and delete the new object when a list object is deleted while it is being copied.

12. The article of manufacture of claim 11 wherein the computer system is a video server, the objects are videos and each stripe is a clip of the video of a predetermined duration.

13. The article of manufacture of claim 11 wherein the computer program code further causes the computer system to stripe the segments sequentially across the storage units.

14. The article of manufacture of claim 11 wherein the computer program code further causes the computer system to execute an access request for a requested object during the re-striping of the segments of the requested object.

* * * * *